US00RE34168E

United States Patent [19]

Ohmura et al.

[11] E Patent Number: Re. 34,168

[45] Reissued Date of Patent: Jan. 26, 1993

[54] LENS-FITTED PHOTOGRAPHIC FILM PACKAGE

[75] Inventors: Hiroshi Ohmura; Takuya Arai; Akira Haishi; Katsuya Kozai; Hiroshi Hara, all of Tokyo; Takashi Tobioka, Saitama; Seiji Asano, Saitama; Junichi Takagi, Saitama, all of Japan

[73] Assignee: Fuji Photo Film Co., Ltd., Kanagawa, Japan

[21] Appl. No.: 689,000

[22] Filed: Apr. 12, 1991

Related U.S. Patent Documents

Reissue of:

[64] Patent No.: 4,954,858
Issued: Sep. 4, 1990
Appl. No.: 314,214
Filed: Feb. 22, 1989

[30] Foreign Application Priority Data

Feb. 22, 1988 [JP] Japan ..... 63-21932[U]
Feb. 22, 1988 [JP] Japan ..... 63-21935[U]
Feb. 22, 1988 [JP] Japan ..... 63-21936[U]

[51] Int. Cl.[5] ..... G03B 15/05; G03B 17/02

[52] U.S. Cl. ..... 354/145.1; 354/212; 354/288

[58] Field of Search ..... 354/145.1, 149.11, 202, 354/212, 288, 127.1, 127.11, 127.12, 64

[56] References Cited

U.S. PATENT DOCUMENTS 3,205,800 9/1965 Peterson ..... 354/288
3,412,661 11/1968 Soumar ..... 354/64
3,763,752 10/1973 Ackerman et al. ..... 354/149.11
4,033,392 7/1977 Less ..... 354/64
4,441,612 4/1984 Kingsley et al. .
4,742,366 5/1988 Nakazawa ..... 354/288
4,797,697 1/1989 Heuer et al. ..... 354/288
4,801,957 1/1989 Vandemoere ..... 354/145.1
4,804,987 2/1989 Arai ..... 354/219
4,812,866 3/1989 Ushiro et al. ..... 354/302

FOREIGN PATENT DOCUMENTS 1059145 2/1967 United Kingdom .
2198250A 6/1988 United Kingdom ..... 354/288

OTHER PUBLICATIONS

Camera News, vol. 42, No. 6, Ser. No. 523, Jun. 20, 1987, pp. 19, 82–85.

*Primary Examiner*—Russell E. Adams
*Assistant Examiner*—David M. Gray
*Attorney, Agent, or Firm*—Young & Thompson

[57] ABSTRACT

A lens-fitted photographic film package has at least an unexposed rolled film, a taking lens, a film transportiong mechanism, an exposure mechanism and an electronic flash as a whole contained in a light-tight case. The light-tight case comprises a main case section formed with a chamber containing therein light-tightly the unexposed rolled film and a front cover section attached to the main case section, the front cover section being formed with at least one opening for partially receiving therein a member of at least one of the mechanisms mounted on the main case section projecting beyond a plane defined by surfaces of the main case section in contact with an inner surface of the front cover section when the front cover section is securely attached to the main case section. The electronic flash unit is short-circuited to maintain the condenser of the flash unit discharged until the rolled film has been loaded in the light-tight case, so as to prevent accidental flashing that would expose the film. The lens-fitted photographic film package is enclosed in an external container having a weakened openable portion capable of being broken away from the external container to expose the contained rolled film for removal after exposure.

22 Claims, 6 Drawing Sheets

LENS-FITTED PHOTOGRAPHIC FILM PACKAGE

Matter enclosed in heavy brackets [ ] appears in the original patent but forms no part of this reissue specification; matter printed in italics indicates the additions made by reissue.

BACKGROUND OF THE INVENTION

The present invention relates to a lens-fitted photographic film package, and more particularly to a photographic film package which has a photographic film, a taking lens, a film transporting means, an exposure means and their associated elements incorporated in a light-tight film case as an integral whole.

A lens-fitted photographic film package can provide many chances to enjoy oneself by easily taking pictures even without a camera. This lens-fitted photographic film package comprises a light-tight film case with a taking lens fitted thereto, a simple exposure mechanism which includes a film transporting mechanism and a shutter mechanism with their associated elements incorporated in the film case, and a 110-size cartridge film or a 35 mm full size film previously contained in the light-tight film case, which can be sold wherever photographic film is sold. The lens-fitted photographic film package, after the exposure of all frames of a roll of film, is forwarded to a photo shop or photo laboratory without removing the film. There, the exposed film is removed by breaking open the lens-fitted photographic film package and is developed to make prints therefrom while the empty lens-fitted photographic film package is scrapped. The prints together with the developed film are returned to the customer. The lens-fitted single-use photographic film package makes it easy to take pictures because of no need for film loading and unloading.

For economy, the film case that incorporates a roll of film and the necessary elements all in one is made of plastic materials and configured as simply as possible. The lens-fitted photographic film package is generally divided into three sections, a main body section which is formed with a film patrone-receiving chamber and a film take-up chamber and has mounted thereon a taking lens and a shutter charging mechanism and a film transporting mechanism; a front cover section attached to the main body section to help support the taking lens and to cover various elements attached to or mounted on the main body section, and a back cover section attached to the back side of the main body section to cover light-tightly the patrone-receiving and film take-up chambers. The lens-fitted photographic film package as sold is enclosed in a thin cardboard or plastic external case with an ornamental pattern printed thereon.

A commercial requirement of such a lens-fitted photographic film package is that it be thin and compact. For example, it is preferably pocket size so that it can be easily carried in a pocket or purse.

A recent tendency is to incorporate electronic flash units in such lens-fitted photographic film packages. Incorporating an electronic flash unit can greatly increase the usage of such lens-fitted photographic film packages.

In manufacturing such lens-fitted photographic film packages with electronic flash units incorporated therein, it is necessary to perform a test discharge of the electronic flash unit in advance of loading a roll of film in the lens-fitted photographic film package. Because the electronic flash unit is charged again after the test discharge, the condenser can be accidentally discharged and expose the film during loading of a roll of film in the lens-fitted photographic film package, particularly if the package is of the type in which the unexposed film is not in a film patrone when assembly is completed. Therefore, it is necessary to maintain the condenser of the electronic flash unit discharged during assembly.

OBJECTS OF THE INVENTION

It is therefore an object of the present invention to provide a lens-fitted photographic film package which is thin and compact for convenience of carrying.

It is another object of the present invention to provide a lens-fitted photographic film package which enables removing a film from the lens-fitted photographic film package without taking the film out of an external case.

It is still another object of the present invention to provide a lens-fitted photographic film package which has an electronic flash unit incorporated therein.

It is a further object of the present invention to provide a lens-fitted photographic film package in which a condenser of the electronic flash unit can be maintained discharged during assembly of the lens-fitted photographic film package.

SUMMARY OF THE INVENTION

To accomplish the above and other objects, the lens-fitted photographic film package according to the present invention has at least a roll of photographic film, taking lens means, film transporting means and exposure means as an integral whole. These are contained in a light-tight case. The case comprises a main case section mounting the taking lens means and exposure means and film transporting means and containing light-tightly the roll of unexposed photographic film; and a front cover section which is attached to the main case section to cover most of the exposure means and film transporting means and associated elements, the front cover section being formed with at least one opening for partially receiving therein a member of at least one of the means and elements mounted on the main case section projecting beyond a spatial datum plane defined by surfaces of the main case section which are in contact with an inner surface of the front cover section when the front cover section is securely attached to the main case section.

According to a preferred embodiment of the present invention, the openings formed in the front cover section receive therein a film transporting knob of the film transporting means and a member covering a part of the shutter mechanism, such as a shutter biasing spring, of the exposure means.

According to another preferred embodiment of the present invention, the lens-fitted photographic film package has electronic flash means contained in the main case section, a pair of terminals mounted on the main case section and electronically connected to electrodes of a condenser of the electronic flash means, and short circuiting means removably disposed in said case to electrically connect the pair of terminals so as to short-circuit the condenser to discharge it until the roll of photographic film has been loaded in the main case section.

According to still another preferred embodiment of the present invention, the lens-fitted photographic film package is enclosed in an external case formed with an openable portion defined by perforated lines which is located in correspondence with a part of the film-receiving chamber. The openable portion of the external case is broken or torn off to form an opening in the external case, through which the exposed film can be removed.

BRIEF DESCRIPTION OF THE DRAWINGS

The above and other objects and features of the present invention will become apparent from the following detailed description taken in conjunction with the preferred embodiments thereof with reference to the accompanying drawings in which like parts are designated by like numerals throughout the views of the drawings and wherein.

DETAILED DESCRIPTION OF THE INVENTION

Figure 1:
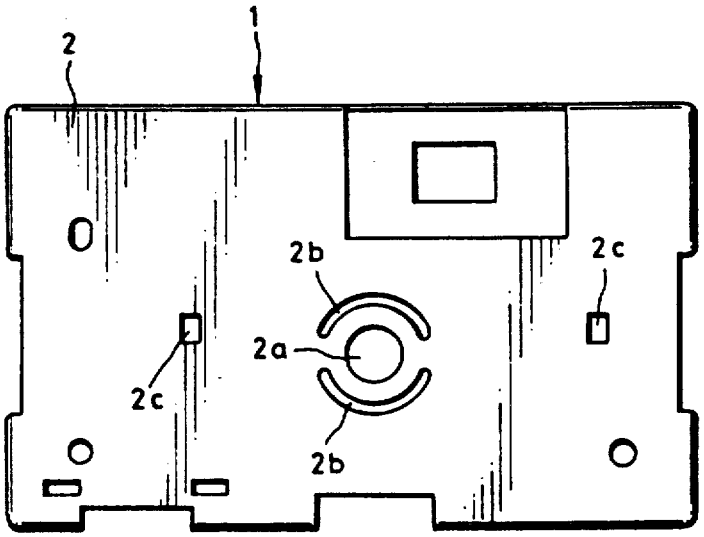
FIG. 1 (PRIOR ART)
FIG. 1 is a front view showing a conventional lens-fitted photographic film package.

Before describing the present invention in detail, reference is made to FIGS. 1 and 2 for the purpose of providing a brief background that will enhance an understanding of the novel structural features of the lens-fitted photographic film package described later. As shown in FIG. 1, the conventional lens-fitted photographic film package has a front cover 1 of which the front wall 2 is formed with several openings such as a lens opening 21 for exposing a taking lens, semi-circular slots 2b enclosing the lens opening 2a for rendering the region of front wall 2 surrounding the lens opening 2a relatively elastic, small openings 2c which are engaged with lugs of a main body section to retain the front cover 1 attached to the main body section, and some holes used for molding the front cover 1. The front cover 1 further has a top wall 3 formed with openings such as an opening 3a for receiving a shutter button 4 and a counter window 3b through which a front counter is viewed.

Figure 2:
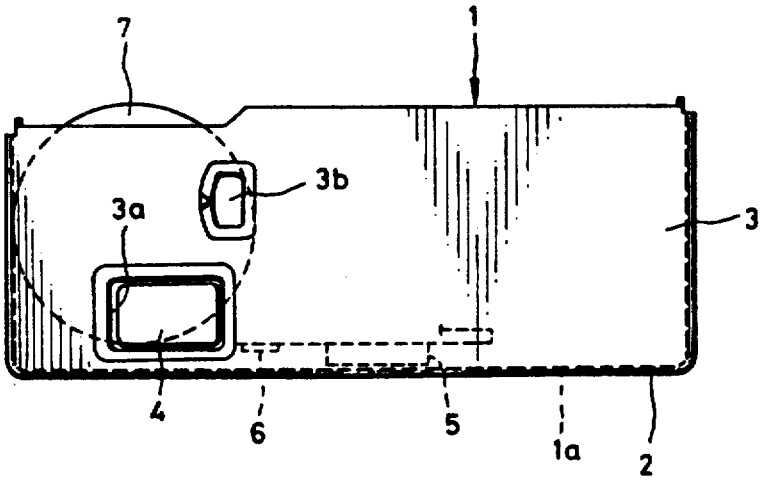
FIG. 2 (PRIOR ART)
FIG. 2 is a top view showing the lens-fitted photographic film package of FIG. 1.
Figure 3:
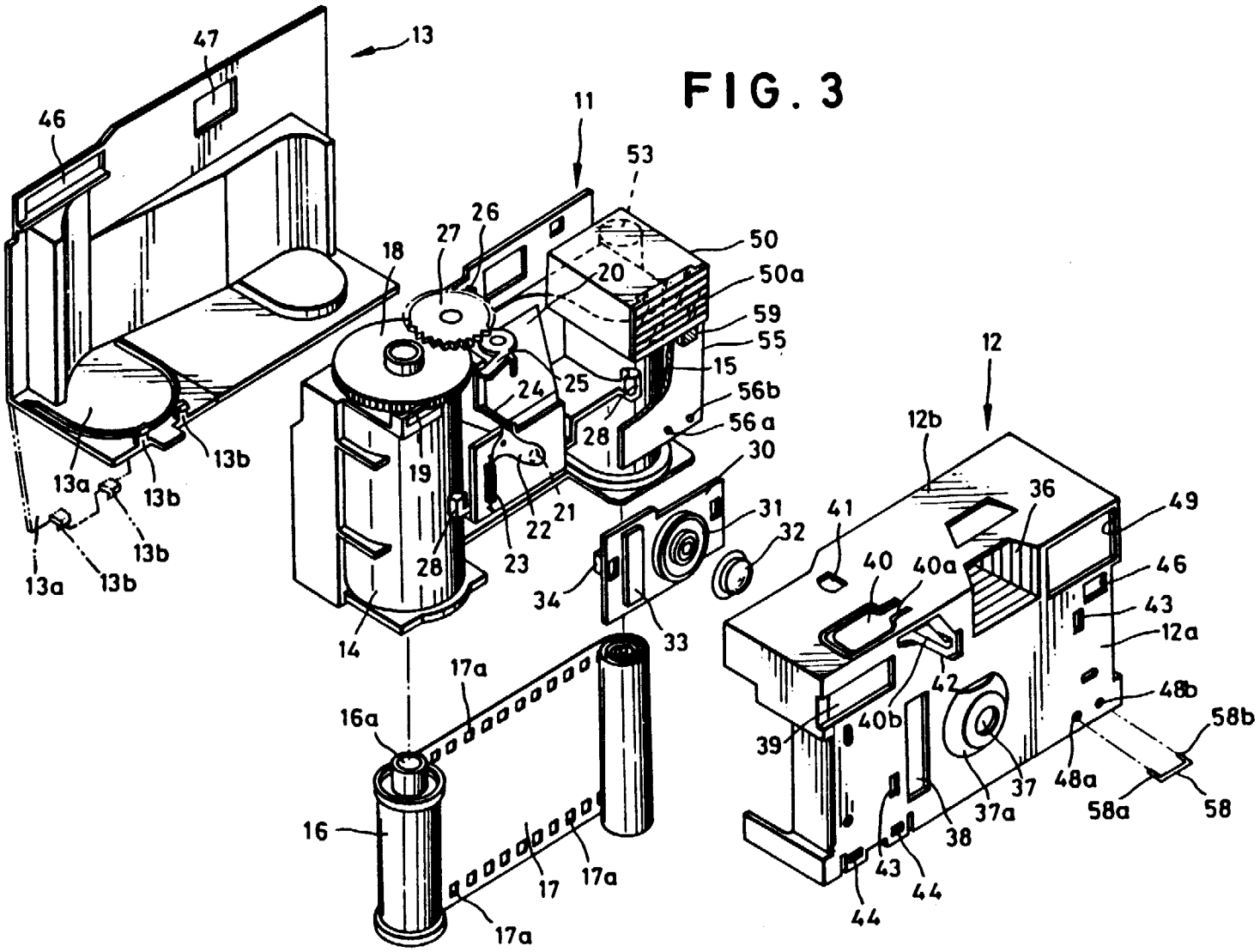
FIG. 3 is an exploded perspective view showing a lens-fitted photographic film package according to a preferred embodiment of the present invention.
Figure 4:
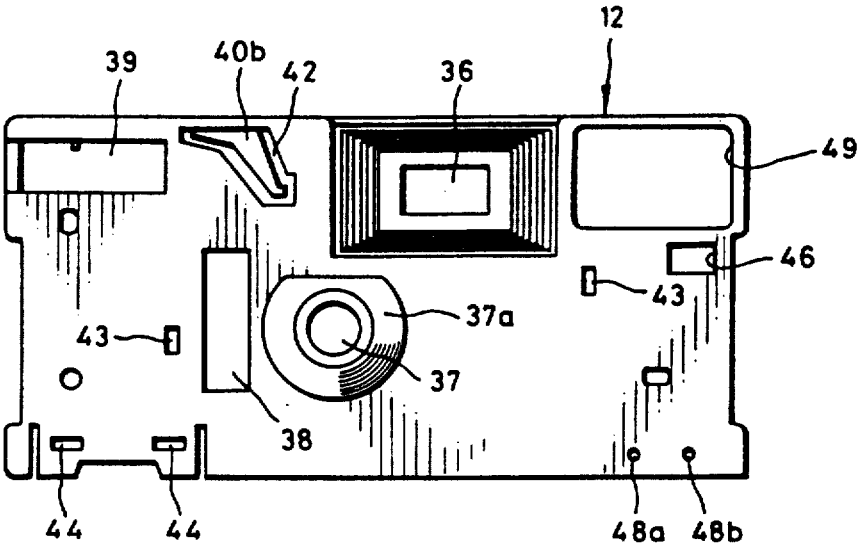
FIG. 4 is a front view, similar to FIG. 1, showing a front case section of the lens-fitted photographic film package shown in FIG. 3.

As is shown in FIG. 2, the main body section has on its front wall a lens holder 5 and a chamber 6 for containing a shutter biasing or charging spring, and on its top wall a film transporting knob 7 which partly protrudes from the case. Indicated by a reference 1a is the inner surface of the front wall 2 of the front cover 1. The lens holder 5 and the spring chamber 6 project from the front wall of the main body section.

As is apparent, the thickness of the package is defined between the external surface of the front wall 2 and the external surface of a rear cover. Because of the provision of the lens holder 5 and the spring chamber 6, the conventional lens-fitted photographic film package is relatively thick.

Referring now to FIGS. 3 to 6, shown therein is a lens-fitted photographic film package (which is hereinafter referred to as a film package for simplicity) of a first preferred embodiment of the present invention. The film package of the present invention comprises a main body section 11, a front cover section 12 and a back cover section 13 which are made of plastic materials and fitted or welded in a well known manner, such as by ultrasonic welding, to form a light-tight box-shaped film container.

The main body section 11 is formed with a film patrone-receiving chamber 14 on the left side and an unexposed film-receiving chamber 15 on the right side. The patrone-receiving chamber 14 receives therein a film patrone or cartridge 16 adapted to contain a roll of photographic film and the unexposed film chamber 15 receives the unexposed photographic film withdrawn from the film patrone 16 and wound up in a roll in chamber 15. The film package of this embodiment has been pre-wound in one direction (left to right in FIG. 3) so that the full length of unexposed film has been wound up into the film take-up chamber 15 before making a first exposure and is rewound by the user from the take-up chamber 15 back into the film patrone 16 in the film patrone-receiving chamber 14 by one frame every exposure.

The main body section 11 is provided with a film rewinding knob 18 rotatably mounted thereon above the film patrone-receiving chamber 14. The film rewinding knob 18 has a film rewinding shaft with a forked end extending into the film patrone-receiving chamber 14 and engaging an external end of a spool 16a of the film patrone 16. The film rewinding knob 18 is formed with teeth on the periphery thereof which are engaged with a ratchet 19 mounted on the main body section 11 for the prevention of rotation thereof in the wrong direction.

An exposure chamber 20 is provided between the film patrone-receiving chamber 14 and the film take-up chamber 15 and is formed with an exposure opening 12 in the front wall thereof. A lens holder plate 30 with a lens mount 31 is attached to the front wall of the exposure chamber 20. A taking lens or lens assembly 32 having a fixed focal length is held by the lens mount 31. The lens holder plate 30 is integrally formed with a rectangular projecting cap 33 forming therebehind a space for receiving therein a spring 23. The lens holder plate 30 is attached to section by engaging hooks 34 engageable with detects 28 formed integrally with the main body section 11.

Between the front wall of the exposure chamber 20 and the lens holder plate 30, there is a shutter blade 22 mounted on the front wall of the exposure chamber 20 for rotation about an axis parallel to the optical axis of the taking lens 32. The shutter blade 22 is biased by the spring 23 to turn in the counterclockwise direction as viewed in FIG. 1 so as to close the exposure opening 21. The shutter blade 22 is formed with an upstanding projection. A shutter charge lever 24 can move to push this projection of the shutter blade 22 so as to turn the shutter blade 22 to open the exposure opening 21 and to charge the biasing spring 23.

A sprocket wheel (not shown) with sprocket teeth, which is well known in the art, is provided behind and close to the film take-up chamber 15 to engage in perforations 17a of film 17 so as to be rotated by the advance of film 17. A one-frame metering cam (not shown) is driven by that sprocket wheel to swing the shutter charge lever 24. Upon such movement of the shutter charge lever 24, a hook lever 25 is turned and is brought into engagement with the film rewinding knob 18, stopping the rotation of the film rewinding knob 18. Such a mechanism is well known in the photographic art as a self-cocking mechanism, and therefore a more detailed description need not be given herein. The sprocket wheel has a shaft 26 with an axially extending V-shaped groove which is engageable with teeth formed on the periphery of a frame or exposure counter disk 27. Through this engagement, the exposure counter disk 27 is advanced by the shaft 26 by one pitch every revolution of the shaft to decrease the displayed count of remaining film frames by one every exposure.

The front cover section 12 is formed with a finder window 36 and a lens hole 37 in its front wall 12a. The lens hole 37 is defined by a circular boss 37a. This boss 37a covers the lens mount 31 and the margin of the taking lens 32. The outer periphery of the taking lens 32 is pressed rearwardly by the inner surface of the boss 37a of the front wall 12a of the front cover section 12 attached to the main body 11. In such a way, the taking lens 32 is fixed between the front cover section 12 and the main body section 11. Due to the provision of the boss 37a for receiving therein the taking lens 32, it is possible to provide the necessary back focal distance while keeping the film package thin.

The front cover section 12 is formed in its front wall 12a with a vertically extending rectangular opening 38 in which the rectangular projecting cap 33 is received and a horizontally extending rectangular opening 39 in which the film rewinding knob 18 is received. The front cover section 12 is further formed in its top wall 12b with a counter opening 41 through which the exposure counter disk 27 can be viewed.

The front cover section 12 is further provided with a shutter release member 40 connected to top wall 12b by an integral elastic bridge 40a. The shutter release member 40 thus formed can be resiliently depressed when pressed with a finger and return upon removing the finger. The shutter release member 40 is provided with an integrally formed shutter release lever 40b extending downwardly therefrom. The lower end of the shutter release lever 40b is engaged by the hook lever 25.

The front cover section 12 is further formed in its front wall 12a with an opening 42 through which a mold for molding the shutter release lever 40b is withdrawn and openings 43 through which molds for molding hooks on the back surface of the front wall 12a are withdrawn. Engaging openings 44 formed in the front wall 12a of the front cover section 12 are engaged by hooks 13b formed integrally with a cover of the back cover section 13 which will be described in detail hereafter. Formed in the front wall 12a of the front cover section 12 are a pair of openings 48a and 48b through which a short circuit rod 58 having electrically integral contact points 58a and 58b is inserted for test discharging of the electronic flash unit 50 that will be described in detail later. Designated by numeral 59 is a flash discharge button for triggering a flash.

The back cover section 13 is attached to the main body section 11 to close light-tightly the film patrone-receiving chamber 14 and the film take-up chamber 15, and the exposure chamber 20. For securely shielding the film from light, the back cover section 13 is welded to the main body section 11 by ultrasonic welding or a special attaching mechanism so as not to be detached by users. The back cover section 13 is formed at the bottom with an integral bottom cover 13a flexibly hinged to the bottom edge thereof. The bottom cover 13a is formed with the hooks 13b along its front edge which are received in and engaged by the engaging openings 44 of the front cover section 12 to close the bottom opening of the film patrone-receiving chamber 14. The back cover section 13 is formed in its back wall with a horizontally extending narrow opening 46 in which the film rewinding knob 18 is received. The film rewinding knob 18 partly extends outside the film package to be operated with fingers. The back cover section is further formed in its back wall with a finder opening 47 in alignment with the front finder opening 36 formed in the front cover section 12.

The film package is assembled by attaching the front cover section 12 to the main body section 11 through the engagement of the detents 28 of the main body section 11 with hooks (not shown) of the front cover section 12 and then ultrasonically welding the back cover section 13 to the main body section 11, and thereafter engaging the hooks 13b of the bottom cover 13a of the back cover section 13 with the engaging openings 44 of the front cover section 12. The assembled film package is shown in FIGS. 5 and 6.

Figure 5:
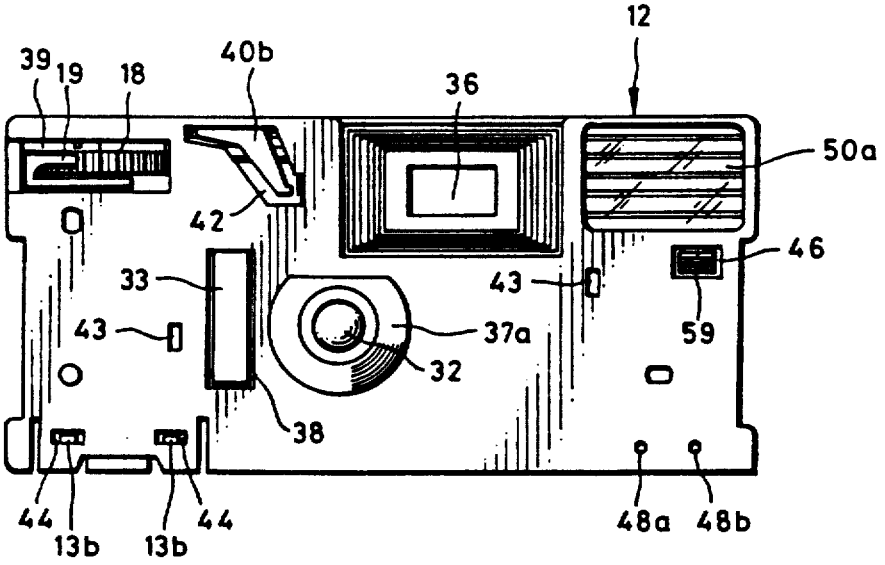
FIG. 5 is a front view showing the lens-fitted photographic film package shown in FIG. 3.
Figure 6:
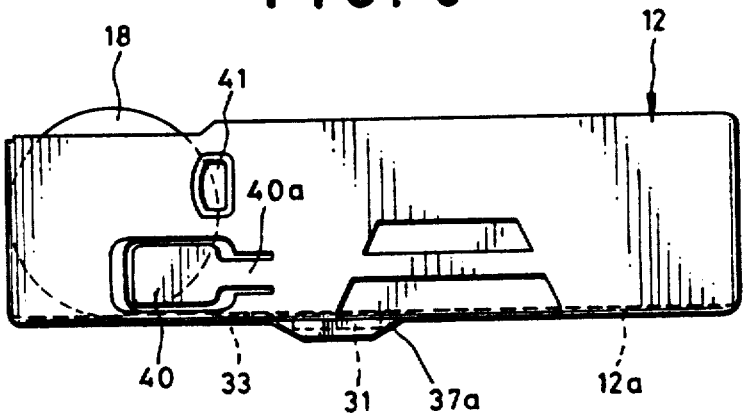
FIG. 6 is a top view, similar to FIG. 2, showing the lens-fitted photographic film package shown in FIG. 3.

As shown in FIG. 5, the assembled film package contains the periphery of the film rewinding knob 18, and the ratchet 19 in mesh with the peripheral teeth of the film rewinding knob 18 is disposed in the horizontally extending rectangular opening 39 formed in the front wall 12a of the front cover section 12. The vertically extending projecting cap 33 of the lens holder plate 30 is disposed in the vertically extending rectangular opening 38. Thus, as is shown in FIG. 6, the top forward portion of the periphery of the film rewinding knob 18 and the front surface of the vertically extending projecting cap 33 are slightly behind the front surface of the front wall 12a of the front cover section 12. Therefore, the thickness of the film package has been reduced to the sum of the diameter of the film rewinding knob 18 and the thickness of the front wall 12a of the front cover section 12, less the distance by which the film rewinding knob 18 overlaps the thickness of the front wall 12a.

As seen in FIG. 5, the top of the boss 37a is cut away horizontally. The cut-away portion of the boss 37a provides enough space between the lens opening 37 and the front finder window 36 to allow that part of the external cardboard or plastic container between the openings of the external container that expose the taking lens and the front finder window to be formed desirably wide. Such wide bridging parts between openings help prevent breakage of the external container.

It is to be noted that the front cover section may be formed with other openings which receive therein parts, if permissible, projecting in an axial forward direction from the main body section 11 and that the back cover section can be formed with openings which receive therein parts projecting in an axially rearward direction from the main body section 11.

Figure 7:
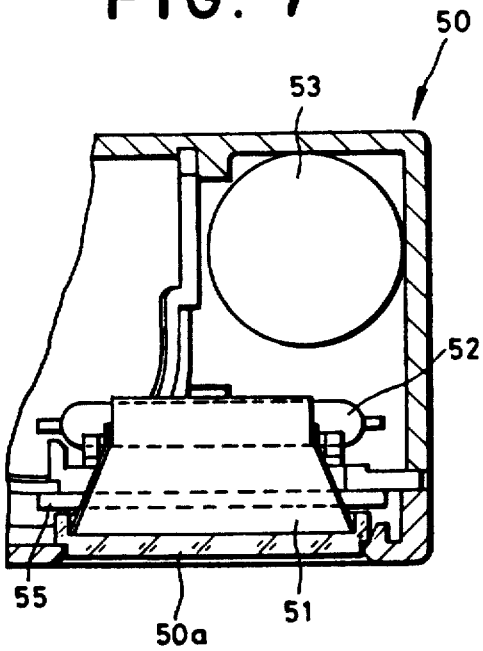
FIG. 7 is a sectional view showing the structure of an electronic flash unit incorporated in the lens-fitted photographic film package shown in FIG. 3.

As is shown in FIG. 7, the electronic flash unit 50 attached to the main body section 11 comprises a reflector 51 having a parabolic reflective surface disposed behind the diffusion glass 50a, a discharge tube 52 disposed along the horizontal axis of the parabolic reflective surface of the reflector 51, and a flash power source (not shown). A cylindrical condenser 53 is vertically disposed behind and to the right of the reflector 51.

A circuit board 55 on which a flash control circuit is printed is disposed in front of the film take-up chamber 15. The condenser 53 is connected to the flash control circuit as well as to short-circuit terminals 56a and 56b disposed on the circuit board 55 correspondingly to the openings 48a and 48b of the front cover section 12a, respectively. The short-circuit terminals 56a and 56b on the circuit board 55 can be electrically connected by means of the short-circuit rod 58 of which contact arms 58a and 58b are inserted through the access openings 48a and 48b to short circuit the condenser 53.

The main body section 11 on which the electronic flash unit 50 is installed is attached to and covered by the front cover section 12. Then, before loading a film, the electronic flash unit 50 is subjected to a test discharge. For this, the short-circuit rod 58 is used. If the discharge tube 52 properly flashed when short-circuiting the condenser 53 with the short-circuit rod 58, the short-circuit rod 58 is kept inserted in the access openings 48a and 48b to maintain the condenser 53 fully discharged until a film patrone and a rolled unexposed film are loaded and the back cover section 13 is attached to close light-tightly the film patrone-receiving chamber 14 and the film take-up chamber 15.

After having completely assembled the film package but before inserting it into an external container, the short-circuit rod 58 is removed.

Figure 8:
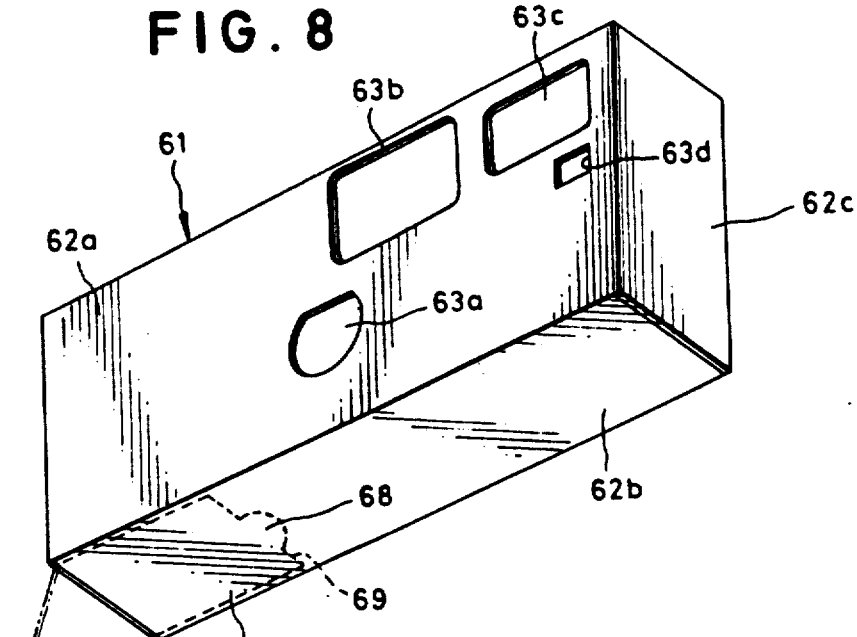
FIG. 8 is a perspective view showing an external container in which the lens-fitted photographic film package of FIG. 3 is to be enclosed.

Referring to FIG. 8, there is shown an external container 61 made of a printable cardboard or printable plastic material for receiving therein the film package shown in FIGS. 3 to 6. As shown, the external container 61 is formed with openings 63a, 63b and 63c in its front wall 62a for exposing the boss 37a that receives and encloses the taking lens 32 therebehind, the front finder window 36 and the diffusion glass 50a of the electronic flash unit 50, respectively. The external container 61 is further formed with an openable portion 67 defined by three perforated lens 69 in the bottom wall 62b. The openable portion 67 is so located as to overlie the bottom cover 13a of the back cover section 13 when the film package is encased and is formed similar to but sightly larger than the outline of the bottom cover 13a of the back cover section 13. A tab 68 is defined by a semi-circular perforated line in one of the three perforated lines 69. The tab 68 is partly separated from the bottom wall 62b of the external case 61 for being easily picked up and peeled off with the fingers.

The external container 61 has an end flap 62c which is closed and adhesively secured thereto after inserting the film package thereinto so as to form an end wall of the external container 61.

Figure 9:
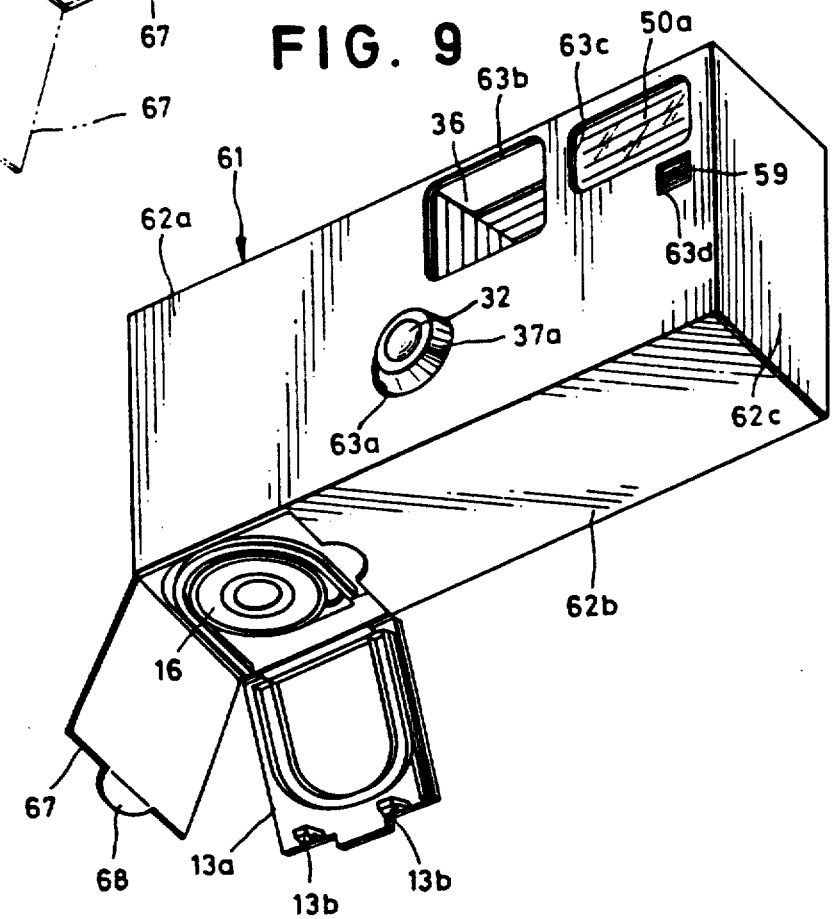
FIG. 9 is a perspective view showing the lens-fitted photographic film package enclosed in the external container with the bottom cover open.

After the use of the film package, as is shown in FIG. 9, the openable portion 67 of external container 61 is broken or torn off along the perforated lines 69 by pulling on the tab 68 with the fingers to expose the bottom cover 13a of the back cover section 13. Then, the bottom cover 13a is opened by disengaging the hooks 13b from the engaging openings 44 of the front wall 12a of the front cover section 12. Thereupon, the patrone 16 can be easily removed axially. The removed film patron 16 containing the exposed film is then handled in the same manner as conventional film patrones, while the film package is scrapped.

Figure 10:
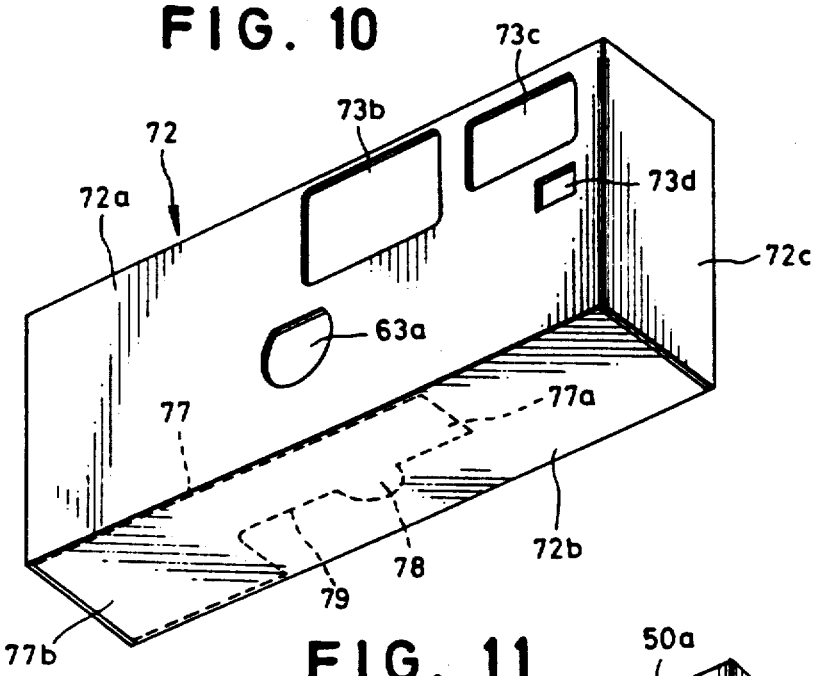
FIG. 10 is a perspective view showing an external container of another preferred embodiment of the present invention.
Figure 11:
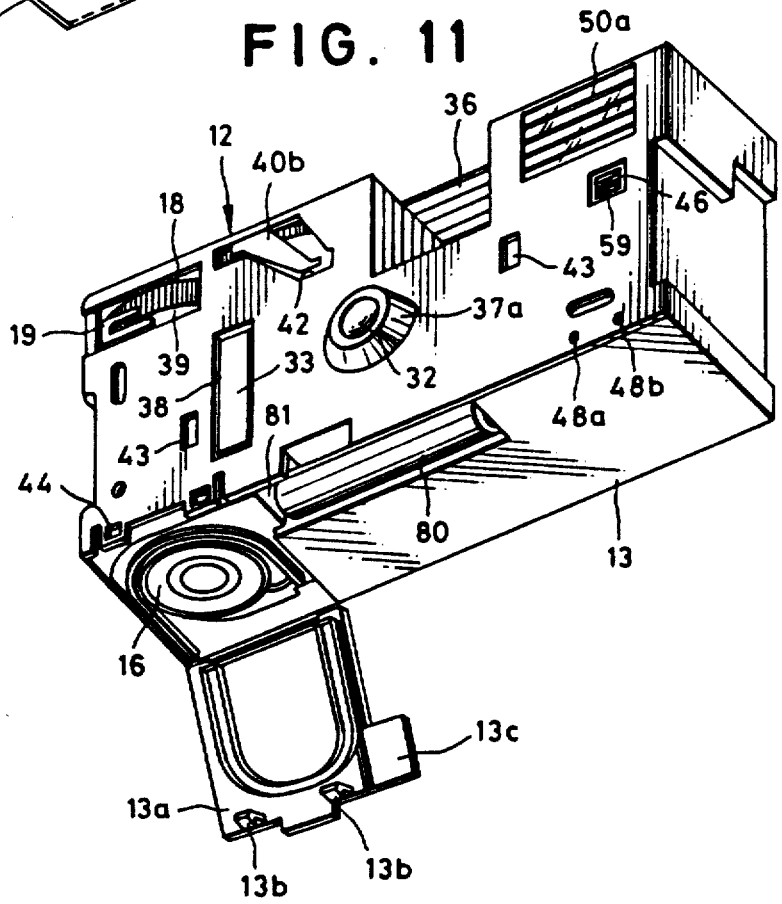
FIG. 11 is a perspective view showing a lens-fitted photographic film package with a bottom cover open which is enclosed in the external container shown in FIG. 10.

Referring now to FIG. 10, there is shown another external container 61 made of a printable cardboard or printable plastic material for receiving therein a film package shown in FIG. 11. In FIG. 11, parts and elements which are identical in structure and operation to those of the film package shown in FIGS. 3 to 6 are designated by similar reference characters, and therefore need not be described in detail herein. The film package shown in FIG. 11 is generally similar in construction to the film package shown in FIGS. 3 to 6. The only difference of the film package shown in FIG. 11 is that a power source of the electronic flash unit 50 such as a battery 80 is received in an open-bottom battery chamber 81 formed adjacent the bottom opening of the film patrone-receiving chamber 14 in the film package. The battery 80 in the open-bottom battery chamber 81 is held in place by a section 13c integrally formed with the bottom cover 13a when the bottom cover 13a of the back cover section 13 is closed to close the film patrone-receiving chamber light-tightly, whereby the battery 80 is prevented from leaving the film package.

As shown in FIG. 10, the external container 72 is formed with openings 63a, 73b and 73c in its front wall 72a for exposing the boss 37a receiving and enclosing the taking lens 32 therebehind, the front finder window 36 and the diffusion glass 50a of the electronic flash unit 50, respectively. The external container 72 is further formed with a generally L-shaped openable portion 77 defined by perforated lines 79 in the bottom wall 72b of the external container 72. The openable portion 77 is so located as to overlap the bottom cover 13a and the open bottom battery chamber 81 of the film package when the film package is encased, and is formed similar to but slightly larger than the outline of the bottom cover 13a and the open-bottom battery chamber 81 of the film package. In more detail, the L-shaped openable portion 77 comprises a stem portion 77a and an arm section 77b for covering the open-bottom battery chamber 81 and the bottom cover 13a, respectively.

A tab 78 is defined by a semi-circular perforated line in one of the three perforated lines 79. The tab 78 is partly separated from the bottom wall 72b of the external case 72 for being easily picked up and peeled off with fingers.

After the use of the film package, the openable portion 77 of the external case 72 is broken or torn off along the perforated lines 79 by pulling on the tab 78 with the fingers to expose the bottom cover 13a and the battery chamber 81 of the film package. Then, the bottom cover 13a is opened by disengaging the hooks 13b from the engaging openings 44 of the front wall 12a of the front cover section 12. Thereupon, the patrone 16 and the battery 80 can be easily removed. The film patrone 16 taken out is then handled in the same manner as conventional film patrones while the film package and the battery are scrapped separately.

In any embodiment described above, it is to be noted that the external container 61 or 72 may be provided with an opening through which a finger can be inserted, in place of the tab 67 or 78 and that, instead of forming the cover section and the perforated line for defining the openable portion in the bottom wall of the main case section and the external container, respectively, the bottom cover may be formed either in the back cover section or in an end wall of the front case section, and hence the perforated line may be correspondingly formed either in the back wall or in an end wall of the external container, respectively. It is also to be noted that the roll of photographic film can be used without being advanced frame by frame into a patrone or cartridge.

Furthermore, though in the above-described embodiments the openings 48a and 48b are formed in the front wall of the front cover section 12, the openings 48a and 48b may be defined in any other wall, for example in an end wall. That is, the position of the openings 48a and 48b may be located according to the position of the circuit board 55. Instead of the pair of openings 48a and 48b, one opening may be formed if the short-circuit rod 58 can be inserted through the opening. The condenser 53 and flash power source may be disposed in another position instead of behind the reflector 51.

Although the present invention has been fully described by way of preferred embodiments thereof with reference to the accompanying drawings, it is to be noted that various changes and modifications will be apparent to those skilled in the art. Therefore, unless otherwise such changes and modifications depart from the scope of the present invention as defined by the appended claims, they should be construed as included therein.

What is claimed is:

1. A lens-fitted photographic film package having at least a roll of unexposed photographic film, a taking lens, shutter means and film transporting means, said lens-fitted photographic film package comprising:

a main case section which is open at its front, said main case section mounting at least said shutter means and said film transporting means and containing light-tightly said roll of unexposed photographic film;

a front cover section which is attached to said main case section and closes said open front of said main case section to cover the majority of said taking lens and said shutter means and said film transporting means, said front cover section being formed with at least one opening for partly receiving therein a member of one of said means, which member projects forwardly beyond surfaces of said main case section which are in contact with an inner surface of said front cover section which said front cover section is securely attached to said main case section.

2. A lens-fitted photographic film package as defined in claim 1, in which said projecting member received by said opening protrudes no farther than an outer surface of said front cover section.

3. A lens-fitted photographic film package as defined in claim 2, wherein said member received in said opening extends within said opening in a direction parallel to the optical axis of said taking lens means.

4. A lens-fitted photographic film package as defined in claim 1, wherein said member is a film transporting knob of said film transporting means.

5. A lens-fitted photographic film package as defined in claim 1, wherein said member is a forwardly projecting cap covering a biasing spring for biasing said shutter.

6. A lens-fitted photographic film package as defined in claim 1, wherein said roll of unexposed photographic film is previously fully withdrawn from a film cartridge and is rewound into said cartridge upon exposure, by one frame every exposure.

7. A lens-fitted photographic film package having at least a roll of unexposed photographic film, a taking lens, and electronic flash means, as a whole contained in a case, said lens-fitted photographic film package comprising:

a main case section of said case, mounting said taking lens and said electronic flash means and containing light-tightly said roll of photographic film;

a pair of terminals mounted on said main case and electrically connected to electrodes of a condenser of said electronic flash means;

a front case section of said case, securely attached to said main case section to cover said main case section; and at least one opening provided in said [front] case [section] so as to allow a short-circuit means access to said pair of terminals through said at least one opening for discharging said condenser.

8. A lens-fitted photographic film package as defined in claim 7, wherein said pair of terminals are provided on a circuit board on which an electronic flash control circuit is provided.

9. A lens-fitted photographic film package as defined in claim 7, wherein said at least one opening is two openings and said two openings are formed in said front case section.

10. A lens-fitted photographic film package as defined in claim 7, further comprising short-circuiting means in the form of an electrically conductive U-shaped clip short-circuiting said condenser.

11. A lens-fitted photographic film package as defined in claim 10, said U-shaped clip having legs that extend through said at least one opening in said front case section and contact said terminals.

12. A lens-fitted photographic film package as defined in claim 7, wherein said roll of unexposed photographic film is previously fully withdrawn from a film cartridge and is rewound into said cartridge upon exposure, by one frame every exposure.

13. A lens-fitted photographic film package having at least a roll of unexposed photographic film and taking lens means, comprising:

a parallelepipedal light-tight case mounting said taking lens means and containing said roll of unexposed photographic film in a chamber formed therein, said chamber being closed by an openable cover; and a parallelepipedal external container in which said light-tight film case is shape-matingly enclosed having a weakened openable portion directly overlying said openable cover and which can be opened only by being broken away from said external container to expose said openable cover.

14. A lens-fitted photographic film package as defined in claim 13, wherein said openable portion is defined by a perforation.

15. A lens-fitted photographic film package as defined in claim 13, further comprising electronic flash means contained in said light-tight case and a battery for charging said electronic flash means, said battery being located at the bottom of said light-tight case adjacent to said chamber.

16. A lens-fitted photographic film package as defined in claim 15, wherein said openable cover covers said chamber and partly covers said battery.

17. A lens-fitted photographic film package as defined in claim 16, wherein said battery is disposed in an externally opening recess in said light-tight case, said cover having a portion that closes only part of said recess and that overlies only part of said battery.

18. A lens-fitted photographic film package as defined in claim 13, wherein said roll of unexposed photographic film is previously fully withdrawn from a film cartridge and is rewound into said cartridge upon exposure, by one frame every exposure.

19. A lens-fitted photographic film package which is elongated in a horizontal direction and has a bottom wall and is preloaded with a film contained in a cartridge in a film cartridge receiving chamber in said package, said package having exposure means for said film and a flash device actuated to flash by electrical energy from a battery, comprising:

a first opening formed in said bottom wall for removing said film cartridge from said film cartridge receiving chamber;

a second opening for removing said battery, said second opening extending in the longitudinal direction of said package near said film cartridge receiving chamber and connecting with said first opening; and a cover member openably fitted over said first opening for covering said first opening, said cover member covering at least partially said second opening for preventing the removal of said battery when said cover member is closed.

20. A lens-fitted photographic film package as defined in claim 19, wherein said second opening is disposed in said bottom wall.

21. A lens-fitted photographic film package as defined in claim 20, wherein said second opening is in longitudinal prolongation of said first opening lengthwise of said package.

*22. A lens-fitted photographic film package as defined in claim 7, wherein said at least one opening is provided in said front case section.*

* * * * *